Patented Apr. 10, 1951

2,548,471

UNITED STATES PATENT OFFICE 2,548,471

LUBRICATING MEANS RESISTANT TO CHEMICAL ATTACK

John F. Gall, Narberth, Pa., assignor to The Pennsylvania Salt Manufacturing Company, Philadelphia, Pa., a corporation of Pennsylvania No Drawing. Application September 30, 1948, Serial No. 52,139

6 Claims. (Cl. 252—58)

This invention relates to methods and means for lubricating moving parts, and for sealing the space around such parts, particularly adapted for equipment where the lubricant may come into contact with highly reactive materials such as fluorine or fluorine-containing compounds.

Heretofore there has been no suitable liquid lubricant material sufficiently resistant to attack by elemental fluorine to make possible the design of equipment such as compressors where good lubrication is required and where the lubricant may come into contact with elemental fluorine in gaseous or liquid form. The complete lack of such equipment is shown by the fact that when elemental fluorine is commercially packaged in cylinders at the present time it is liquefied by the highly expensive method of refrigeration.

I have now discovered that the molten composition consisting of potassium fluoride and hydrogen fluoride in the proportion of from 1 to 7 mols hydrogen fluoride per mol potassium fluoride suprisingly possesses good lubricating qualities. Since this composition does not dissolve fluorine nor react with it, it is particularly suitable to use this material as lubricant and sealing liquid in equipment for handling elemental fluorine, for example in a mechanical compressor or pump for compressing the fluorine into commercial packages.

I prefer to vary the composition of the lubricant in accordance with the temperature range in which it is to be used. In this way, the desired properties of fluidity and low vapor pressure may be controlled. For example, if the lubricant is to be used in the range 0 to 30° C., I prefer to use a composition containing about 7 mols of HF per mol of KF; if the temperature range is 75 to 150° C., I prefer to use 2 mols of HF per mol of KF; while if the temperature range is 235 to 300° C., I prefer to use 1 mol of HF per mol of KF.

My new lubricant composition may advantageously be employed at the temperature ranges indicated in the preceding paragraphs in which ranges it is a clear liquid of about the fluidity of water with a hydrogen fluoride vapor pressure less than about 25 cm. of mercury. These properties, along with its excellent lubricating qualities, make the liquid quite suitable for being maintained, as a film or body of liquid, between relatively moving surfaces formed of such materials as iron, copper, nickel, the Monel alloys, plastics and cements resistant to fluorine and hot acid fluorides, and other solid surfaces having such resistance, when highly reactive materials such as elemental fluorine, halogen fluorides, or hot acid fluorides are being handled in contact with such surfaces and may come into contact with the film or body of liquid.

In some applications it may be desirable to incorporate another component that dissolves in the molten KF-HF composition (e. g. another alkali metal or other fluoride) or even a finely divided solid filler or additional lubricant, such as cryolite, fluorspar, graphite, or other material resistant to fluorine and hot acid fluorides (e. g. solids of the type mentioned in the preceding paragraph), to give more body, or other altered characteristics to my lubricant composition.

Illustrative types of equipment where the lubricant and/or sealing properties of this composition may advantageously be made use of are described in the examples which follow:

Example 1

It was found possible to compress such reactive gases as elemental fluorine with a conventional reciprocating piston and cylinder type of compressor, if the space between the outer piston wall and the inner cylinder wall of the compressor was lubricated with a fluid composed of one mol of KF and about 2 mols of HF maintained at a temperature of 100° C.

Example 2

A fluid, resistant to highly reactive materials such as fluorine, found suitable for use in a liquid sealing gland is composed of about one mol of KF and about 2 mols of HF, maintained at a temperature of 100° C.

Example 3

A sealing gland for a rotating shaft like that described on page 38 of "Laboratory Methods of Organic Chemistry" by Gattermann and Wieland (MacMillan Company, New York, 1932 edition) in which the mercury is replaced by the fluid described above, was found to seal effectively such reactive gases as elemental fluorine.

When working at a temperature other than 100° C., the composition of the above examples is varied as set forth earlier in this specification, or, in order to adjust the melting point of the composition, alter its body, or modify its characteristics in other ways, additional ingredients may be incorporated, as hereinbefore discussed. Moreover, other metal fluorides, particularly other alkali metal (including ammonium) fluorides, may be substituted in whole or in part for the potassium fluoride of my composition. Ammonium fluoride is particularly suitable as a substitute for potassium fluoride. Sodium fluoride is very high melting and hence could be included in substantial amount only in compositions intended to be used at relatively high temperatures, and under these conditions one may have to contend with the problem of high HF vapor pressure. Caesium fluoride (except for its cost) is an acceptable substitute for, or addition to, the potassium fluoride. In general, other metal fluorides approximating the melting point of potassium fluoride may be included in my composition with advantage for particular applications.

Since many modifications are possible in the apparatus and process of my invention as above described without departing from the scope of my invention, it is intended that the above description of my invention should be interpreted as illustrative, and the invention is not to be limited thereby.

I claim:

1. In processes for handling highly reactive materials involving contact of such materials with surfaces designed to be moved relatively to each other, the improvement that comprises maintaining, as lubricant between said surfaces, a liquid composition containing metal fluoride and hydrogen fluoride, said composition containing from 1 to 7 mols hydrogen fluoride per mol metal fluoride.

2. In processes for handling highly reactive materials involving contact of such materials with surfaces designed to be moved relatively to each other, the improvement that comprises maintaining, as lubricant between said surfaces, a liquid composition of potassium fluoride and hydrogen fluoride, said composition containing from 1 to 3 mols hydrogen fluoride per mol potassium fluoride and said composition being maintained at a temperature of at least about 75° C.

3. In processes for handling elemental fluorine involving contact of this material with surfaces designed to be moved relatively to each other, the improvement that comprises maintaining, as lubricant between said surfaces, a liquid composition of potassium fluoride and hydrogen fluoride, said composition containing from 1 to 3 mols hydrogen fluoride per mol potassium fluoride and said composition being maintained at a temperature of at least about 75° C.

4. In processes for handling highly reactive materials involving contact of such materials with surfaces designed to be moved relatively to each other, the improvement that comprises maintaining between said surfaces a liquid composition containing alkali metal fluoride and hydrogen fluoride, said composition containing from 1 to 7 mols hydrogen fluoride per mol alkali metal fluoride.

5. In processes for handling highly reactive materials involving contact of such materials with surfaces designed to be moved relatively to each other, the improvement that comprises maintaining between said surfaces a liquid composition containing potassium fluoride and hydrogen fluoride, said composition containing from 1 to 7 mols hydrogen fluoride per mol potassium fluoride.

6. In processes for handling highly reactive materials involving contact of said materials with surfaces designed to be moved relative to each other, the improvement that comprises using as a sealing liquid between such surfaces a potassium fluoride-hydrogen fluoride composition in the liquid state, said composition containing from 1 to 3 mols hydrogen fluoride per mol potassium fluoride and being maintained at a temperature of from 75 to 250° C.

JOHN F. GALL.

REFERENCES CITED

The following references are of record in the file of this patent:

UNITED STATES PATENTS

| Number | Name | Date |
|---|---|---|
| 2,411,159 | Hanford | Nov. 19, 1946 |
| 2,436,929 | Linn | Mar. 2, 1948 |
| 2,446,251 | Stricklin | Aug. 3, 1948 |
| 2,467,145 | Morway | Apr. 12, 1949 |

OTHER REFERENCES

A Dictionary of Chemical Solubilities—Inorganic, 2nd edition enlarged. Comey and Hahn, 1921, MacMillan Co., page 760 pertinent.